(12) United States Patent
Nasr Azadani et al.

(10) Patent No.: US 12,723,572 B1
(45) Date of Patent: Sep. 1, 2026

(54) HYBRID FLEXIBLE ENERGY SOLUTION USING GEOTHERMAL AND HYDROGEN FOR DATA CENTER APPLICATIONS

(71) Applicant: Microsoft Technology Licensing, LLC, Redmond, WA (US)

(72) Inventors: Ehsan Nasr Azadani, Sammamish, WA (US); Sonia Maleky, Newport Beach, CA (US); Sean Michael James, Olympia, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 19/209,118

(22) Filed: May 15, 2025

(51) Int. Cl.
*F03G 4/00* (2006.01)
*H02J 3/0012* (2026.01)
(Continued)

(52) U.S. Cl.
CPC ............. *F03G 4/037* (2021.08); *F03G 4/029* (2021.08); *H02J 3/0012* (2020.01); *H02J 3/32* (2013.01); *H02J 3/381* (2013.01); *H02J 15/50* (2026.01); *F03G 4/023* (2021.08); *F03G 4/072* (2021.08); *H02J 3/46* (2013.01); *H02J 13/181* (2026.01); *H02J 2101/20* (2026.01); *H02J 2101/30* (2026.01); *H02J 2105/425* (2026.01)

(58) Field of Classification Search
CPC . F03G 4/001; F03G 4/02; F03G 4/023; F03G 4/026; F03G 4/029; F03G 4/037; F03G 4/04; F03G 4/072; F03G 6/064; H02J 3/0012; H02J 3/18; H02J 3/28; H02J 3/32; H02J 3/381; H02J 3/46; H02J 15/50; H02J 2101/20; H02J 2101/30; H02J 2105/425; H02J 13/181; H02J 13/182
See application file for complete search history.

(56) References Cited

U.S. PATENT DOCUMENTS 7,334,406 B2 * 2/2008 Licari .................. F24D 11/002 60/641.2
11,214,486 B2 * 1/2022 Carey ..................... C25B 15/02
(Continued)

FOREIGN PATENT DOCUMENTS

DE 102023124449 A1 3/2025

OTHER PUBLICATIONS

International Search Report and Written Opinion received for PCT Application No. PCT/US2026/018251, Jun. 22, 2026, 14 pages.

*Primary Examiner* — Binh Q Tran

(57) ABSTRACT

Technology is disclosed for providing high availability electrical power to a data center using renewable energy sources. A system includes a geothermal extraction well and an underground hydrogen storage. In some cases, the underground hydrogen storage leverages the exterior cavity of the geothermal extraction well created during a pipe-in-pipe drilling process. The system further includes a turbine-generator system that converts the geothermal energy from the well into primary power for the data center. When a control system detects a disruption in the primary power, a fuel cell is used to generate backup power for the data center by leveraging the hydrogen in the underground storage to generate electricity. In some cases, a battery provides transitional backup power while the fuel cell performs its startup process.

20 Claims, 9 Drawing Sheets

(51) Int. Cl.

| | |
|---|---|
| ***H02J 3/32*** | (2026.01) |
| ***H02J 3/38*** | (2026.01) |
| ***H02J 3/46*** | (2026.01) |
| ***H02J 13/181*** | (2026.01) |
| ***H02J 15/50*** | (2026.01) |
| ***H02J 101/20*** | (2026.01) |
| ***H02J 101/30*** | (2026.01) |
| ***H02J 105/42*** | (2026.01) |

(56) References Cited

U.S. PATENT DOCUMENTS

| | | | | |
|---|---|---|---|---|
| 12,018,596 | B2 * | 6/2024 | O'Donnell | B63H 11/00 |
| 2006/0137349 | A1 * | 6/2006 | Pflanz | F03G 6/045<br>60/641.2 |
| 2013/0240369 | A1 * | 9/2013 | McAlister | H01M 8/186<br>205/343 |
| 2022/0224112 | A1 * | 7/2022 | Ehara | G06Q 50/06 |
| 2023/0163601 | A1 | 5/2023 | Allo | |
| 2024/0072272 | A1 * | 2/2024 | Chhiba | H01M 8/04029 |
| 2024/0352609 | A1 * | 10/2024 | Yanagisawa | C25B 1/04 |

* cited by examiner

Figure 6:
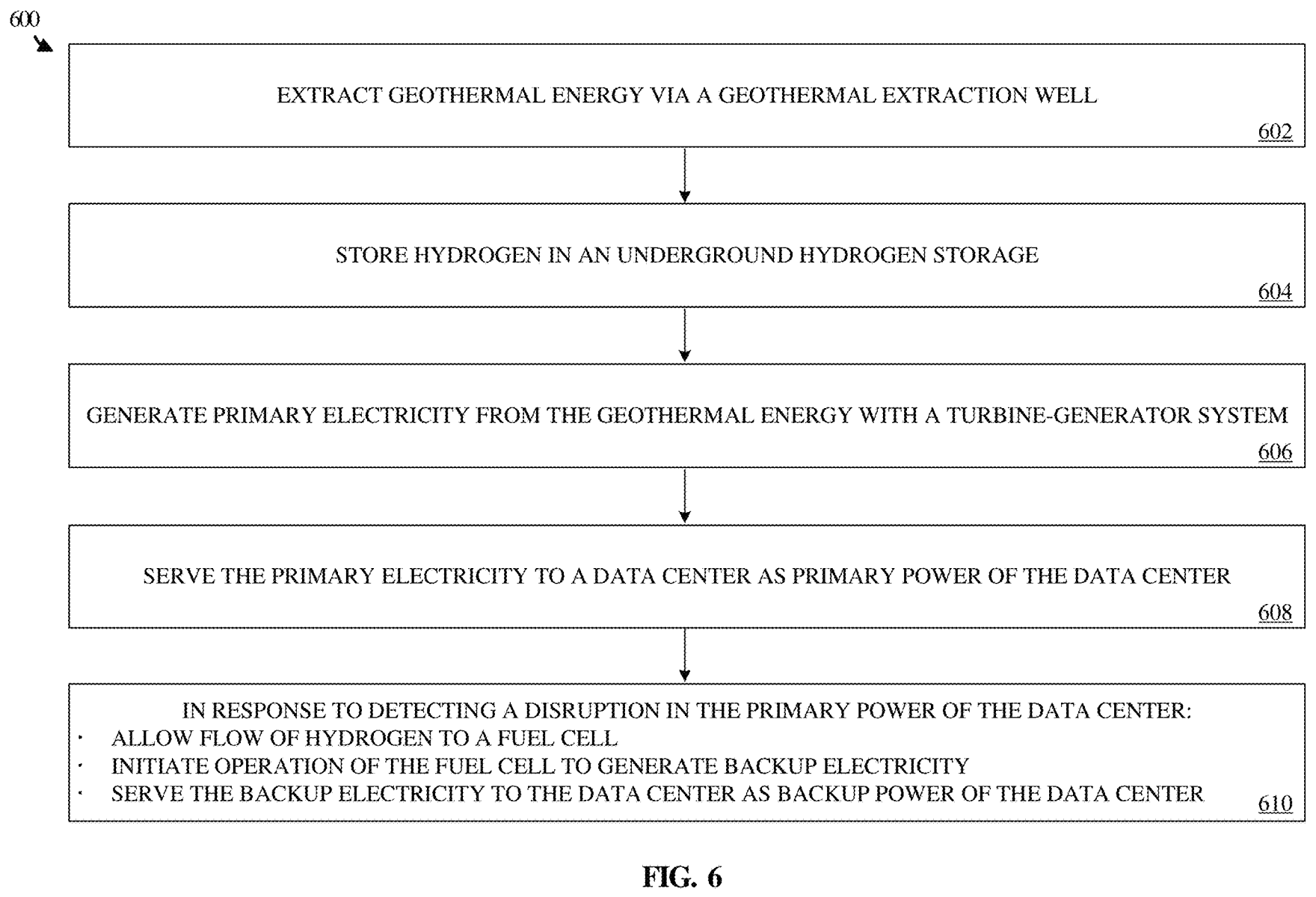

600

EXTRACT GEOTHERMAL ENERGY VIA A GEOTHERMAL EXTRACTION WELL
602

STORE HYDROGEN IN AN UNDERGROUND HYDROGEN STORAGE
604

GENERATE PRIMARY ELECTRICITY FROM THE GEOTHERMAL ENERGY WITH A TURBINE-GENERATOR SYSTEM
606

SERVE THE PRIMARY ELECTRICITY TO A DATA CENTER AS PRIMARY POWER OF THE DATA CENTER
608

IN RESPONSE TO DETECTING A DISRUPTION IN THE PRIMARY POWER OF THE DATA CENTER:
- ALLOW FLOW OF HYDROGEN TO A FUEL CELL
- INITIATE OPERATION OF THE FUEL CELL TO GENERATE BACKUP ELECTRICITY
- SERVE THE BACKUP ELECTRICITY TO THE DATA CENTER AS BACKUP POWER OF THE DATA CENTER

HYBRID FLEXIBLE ENERGY SOLUTION USING GEOTHERMAL AND HYDROGEN FOR DATA CENTER APPLICATIONS

TECHNICAL FIELD

Aspects of the disclosure are related to the field of power generation and, in particular, to flexible solutions for powering data centers.

BACKGROUND

Many data centers provide high availability service, and to provide such service, the data center needs high availability power. In traditional system, the data center relies on power from the public grid. However, to ensure high availability, many data centers have a backup power source. The backup power source most commonly used is a diesel generator. Diesel generator-based power and some grid-based power are not eco-friendly sources. Other types of power generation, such as solar or wind power, are subject to variable ability based on weather conditions at the solar or wind farms. Hydrogen-based solutions often suffer from space and safety constraints. Hydrogen in liquid form takes much less space than hydrogen in gaseous form, but storage in liquid form is challenging due to safety and temperature requirements. Space requirements to store enough hydrogen in gaseous form to support a data center for sufficient duration to provide reliable backup power is not feasible above ground. Accordingly, improvements for powering data centers, and particularly high availability data centers, are needed.

Overview

Technology is disclosed herein for powering data centers using hybrid flexible energy. Geothermal energy is extracted from a geothermal extraction well, and a steam turbine generator system leverages the geothermal energy to provide primary power (i.e., base power) to the data center. A fuel cell that leverages hydrogen to generate electricity serves backup power to the data center. To minimize the overall footprint of the facility, the hydrogen used by the fuel cell is stored underground. In some embodiments, to minimize initial cost and total footprint, including the underground space usage, the geothermal extraction well is created using pipe-in-pipe drilling, and the outer ring of space created during the pipe-in-pipe drilling is used to store the hydrogen. Using techniques described herein, the data center is flexibly powered sufficiently to serve as a high availability data center without using electricity from a public grid.

A system of one or more computers can be configured to perform particular operations or actions by virtue of having software, firmware, hardware, or a combination of them installed on the system that in operation causes the system to perform the actions. One or more computer programs can be configured to perform particular operations or actions by virtue of including instructions that, when executed by data processing apparatus, cause the apparatus to perform the actions. One general aspect includes a system for providing high availability electrical power to a data center. The system includes a geothermal extraction well having an output that emits geothermal energy, underground hydrogen storage, a turbine-generator system coupled to the output of the geothermal extraction well that converts the geothermal energy into electricity that is served to the data center as primary power, and a fuel cell coupled to the underground hydrogen storage via a valve. The fuel cell generates backup electricity using hydrogen from the underground hydrogen storage, and the backup electricity is served to the data center as backup power. The system also includes a control system including a backup controller that may detect a disruption in the primary power of the data center. In response to detecting the disruption, the backup controller transmits a first signal to open the valve to allow flow of the hydrogen to the fuel cell and a second signal to the fuel cell to initiate operation. Other embodiments of this aspect include corresponding computer systems, apparatus, and computer programs recorded on one or more computer storage devices, each configured to perform the actions of the methods.

Implementations may include one or more of the following optional features. Optionally, the underground hydrogen storage may include an area surrounding the geothermal extraction well that was created using pipe-in-pipe drilling. The hydrogen may be stored in gaseous form in one or more sealed containers disposed within the area.

Optionally, the system may include a battery configured to generate transitional backup electricity. In response to detecting the disruption, the backup controller may also send a signal that initiates operation of the battery. The transitional backup electricity is served to the data center as transitional backup power during the startup time of the fuel cell.

Optionally, the system may include a connection to a public electrical grid and a distribution controller. In response to detecting a load requirement of the data center is less than the primary power of the data center, the distribution controller may transmit a signal to open the grid connection to allow flow of excess electricity to the public electrical grid via the connection. Optionally, the system may include an electrolyzer. In response to detecting the load requirement of the data center is less than the primary power of the data center, the distribution controller may transmit a signal to allow flow of excess electricity to the electrolyzer to generate new hydrogen. The backup controller may also transmit a signal to allow flow of the new hydrogen to the underground hydrogen storage. In some embodiments, the underground hydrogen storage may include a buffer tank that is filled by the electrolyzer.

Optionally, the system may include a heat capture system configured to capture excess geothermal energy from the turbine-generator system and provide the excess geothermal energy to a heat reuse application. The heat reuse application may include a direct air capture system. Optionally, the heat capture system may be configured to capture thermal energy from the operation of the fuel cell, operation of the data center, or a combination thereof and provide the captured thermal energy to a heat reuse application, such as a community heat distribution application. Optionally, the system may include two heat capture systems for capturing the excess geothermal energy in one and the excess thermal energy from the fuel cell, which may each provide heat to one or more common or distinct heat reuse applications.

Optionally, the control system may include a distribution control system configured to distribute the primary power and the backup power to one or more racks of the data center. Each of the one or more racks may have a corresponding level of availability (e.g., percentage of time guaranteed available). The distribution of the primary power and the backup power to each of the one or more racks may be based at least in part on the corresponding level of availability for each rack. Implementations of the described techniques may include hardware, a method or process, or computer software on a computer-accessible medium.

This Overview is provided to introduce a selection of concepts in a simplified form that are further described below in the Detailed Description. It may be understood that this Overview is not intended to identify key features or essential features of the claimed subject matter, nor is it intended to be used to limit the scope of the claimed subject matter.

BRIEF DESCRIPTION OF THE DRAWINGS

Many aspects of the disclosure may be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

FIG. 6 illustrates a method for powering a data center with a data center power system, according to various embodiments.

DETAILED DESCRIPTION

Figure 1A:
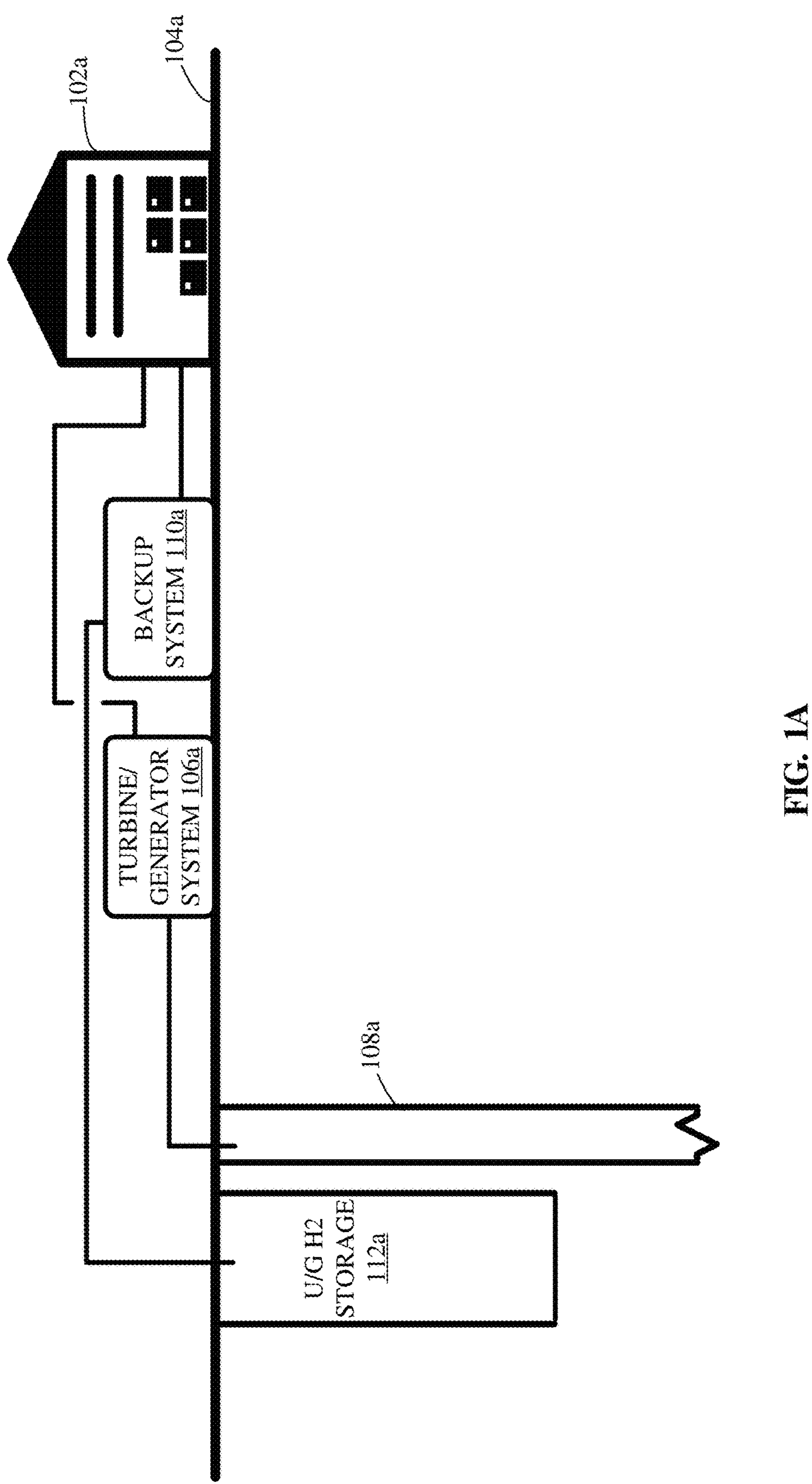
FIGS. 1A and 1B illustrate data center power systems, according to various embodiments.

High availability data centers need consistent electricity sources to ensure they can continuously run. Most data centers are powered by connections to public electrical grids and have backup generators, typically diesel generators, for disruptions in the power provided by the electrical grid. There are, however, several disadvantages to this approach. Power on public electrical grids in some locations is primarily generated using fossil fuels, which are non-renewable resources. Diesel generators similarly rely on fossil fuels. Further, reliance on public grids limits the flexibility of the data center.

To address these and other issues, hybrid flexible solutions for powering data centers are provided herein. Primary power to the data center is generated using a turbine-generator (e.g., a steam turbine generator) that converts geothermal energy to electricity. Backup power is generated with a fuel cell that uses hydrogen to create electricity. The geothermal energy is harvested from a geothermal extraction well. The hydrogen is stored underground until needed. In some embodiments, to further minimize footprint and cost, the geothermal extraction well is drilled using pipe-in-pipe technology, and the outer ring created during drilling is leveraged to store the hydrogen.

A control system is leveraged to distribute the power to racks of the data center. In some embodiments, all racks in the data center receive primary and backup power without distinguishing between the racks (e.g., all racks in the data center are one high availability cluster). In some embodiments, the power, and particularly the backup power, may be distributed based on the availability level of the rack. For example, those racks identified as high availability may be given priority for distributing the power in favor of racks not identified as high availability. The control system also detects disruptions in the primary power to trigger the backup systems. For example, when a disruption is detected, the control system triggers startup of the fuel cell and opens valves to allow the hydrogen stored underground to flow to the fuel cell. Further, in some systems, during the transition time when the fuel cell is starting up, the control system may initiate transitional backup power from a battery to ensure power to the data center while the fuel cell starts up.

During normal operation, the turbine-generator system may generate excess electricity over the data center demands. In such instances, the control system may open a connection with a public grid to feed excess electricity to the public grid. Alternatively or additionally, the control system may initiate an electrolyzer that leverages the excess electricity to generate hydrogen which can be stored in the underground storage or an additional underground hydrogen buffer storage.

An additional feature of the system may include components to leverage thermal energy that would otherwise be wasted in the overall system. For example, excess thermal energy from the geothermal extraction well and the turbine-generator system may be captured and directed to a heat reuse application, such as a direct air capture system used to improve air quality. As another or additional example, thermal energy from operation of the fuel cell, operation of the data center, or both, may be captured and directed to the same or a different heat reuse application. For example, the heat reuse application may be a community heat distribution application.

Advantageously, a data center may be powered using ecologically friendly sources while minimizing the above ground footprint of the data center and power generation facilities. Techniques such as pipe-in-pipe drilling may further ensure that space utilization above and below ground is maximized.

Turning now to the figures, FIG. 1A illustrates hybrid system 100*a* for powering a data center using hybrid, flexible, ecologically friendly fuel sources. Hybrid system 100*a* includes data center 102*a* disposed upon surface 104*a*. Hybrid system 100*a* also includes turbine-generator system 106*a* and backup system 110*a*, each also above ground (i.e., on surface 104*a*). Below surface 104*a* is geothermal extraction well 108*a* and underground hydrogen storage 112*a*. Other components and systems may be present in hybrid system 100*a* that are not depicted here for simplicity and clarity.

Data center 102*a* may be any data center used to provide data storage and computational processing services including cloud-based services. Data center 102*a* may be a specialized facility designed to centralize information technology (IT) operations and equipment for storing, processing, managing, and disseminating data. Data center 102*a* may provide computing power, storage systems, and networking infrastructure used to support digital services, including cloud computing, enterprise applications, content delivery, machine learning, and the like. Functions of data center 102*a* may include hosting servers (compute resources), storing data in scalable, redundant storage systems, application execution (e.g., web applications, artificial intelligence (AI) models), network traffic routing and management both internally and externally, security (e.g., cyber security, physical security), and the like. Data center may include many components not depicted or described in detail herein including a compute layer, a storage layer, a networking layer, a facilities layer, a management layer, and the like. The computer layer may include a server farm that may include racks of physical servers (e.g., blade servers), virtualization, and specialized servers (e.g., general compute, graphical processing unit (GPU) clusters, database servers, and the like). The storage layer may include storage area networks (SANs), network attached storage (NAS), and the like; tiered storage (e.g., flash, solid state drives (SSD), hard disk drives (HDD)); and redundancy such as redundant array of independent disk (RAID) configurations. The networking layer may include top-of-rack (ToR) switches in each rack, aggregation switches that connect multiple racks, core routers that connect the data center to external networks, and corresponding components (load balancers, firewalls, and the like) to implement networking. The facilities layer may include cooling units, security systems, and power systems. The power systems include the power solutions discussed in more detail herein including turbine-generator system 106*a* and backup system 110*a* Data center 102*a* may ensure high availability with failover and redundancy. The level of availability provided by data center 102*a* may be determined on a rack-by-rack level, in some embodiments. Levels of availability are determined by the percentage of time the data center's systems are operational and accessible. This may be described in a percentage format or by classification (e.g., five nines, disaster recovery, and the like).

Surface 104*a* illustrates ground level. Everything above surface 104*a* is above ground, and everything below surface 104*a* is underground.

Geothermal extraction well 108*a* may be any well used to extract geothermal energy (i.e., heat) from heat naturally stored beneath surface 104*a*. Hot rocks and fluids at varying depths below surface 104*a* may be accessed by geothermal extraction well 108*a*. While geothermal extraction well 108*a* is depicted as vertical, it may extend horizontally or in any direction to access the geothermal energy. In some cases, naturally occurring steam may be accessed, which can be piped directly out of geothermal extraction well 108*a*. In some cases, hot water may be accessed, which can be separated into steam and liquid, and the steam may be piped out of geothermal extraction well 108*a*. In some cases, hot, dry rocks may be accessed. A carrier fluid may be injected, which is heated by the hot, dry rocks, and is then pumped back out in a closed loop system where steam from the heated fluid is captured.

Turbine-generator system 106*a* may include a steam turbine and generator. The steam extracted from geothermal extraction well 108 is used to spin the steam turbine, converting the geothermal energy (e.g., steam) into mechanical energy. The generator converts the mechanical energy from the spinning steam turbine into electricity. The steam extracted from geothermal extraction well 108*a* is obtained at high pressure and passes through nozzles designed to drop the pressure and increase velocity. The high-speed steam is directed onto turbine blades, which spin the turbine. The turbine may be an impulse turbine, a reaction turbine, or a combination. The spinning turbine includes a shaft that is also spinning at high speed (e.g., 3000 revolutions per minute (RPM) to 3600 RPM). The shaft of the turbine drives the rotor of the generator. The rotor carries electromagnets or is electromagnetically excited via direct current (DC) current to produce a strong magnetic field. A stator surrounds the rotor and has wire coils (e.g., copper windings) embedded in iron cores. An alternating current (AC) is induced in the stator of the generator by the electromagnetic field from the rotor. The AC current is provided as electricity output of turbine-generator system 106*a*. The electricity may be served to data center 102*a* as primary power for data center 102*a*.

Underground hydrogen storage 112*a* may be an underground (i.e., below surface 104*a*) well that is used to store hydrogen. Hydrogen may be stored in liquid or gaseous form. Due to heating and cooling considerations, hydrogen is most often stored in gaseous form. Gaseous hydrogen may be stored in underground hydrogen storage 112*a* by pumping hydrogen into underground hydrogen storage 112*a* or it may be stored in sealed containers that are stored within underground hydrogen storage 112*a*.

Backup system 110*a* may include components to provide backup power to data center 102*a* if a disruption in the primary power (i.e., primary electricity) from turbine-generator system 106*a* is detected. Backup system 110*a* may include fuel cells as the primary backup power source. In some embodiments, backup system 110*a* may also include one or more batteries to serve transitional backup power to data center 102*a* during fuel cell startup. Additional details of an instance of a backup system are provided and described in FIG. 4 and the accompanying description.

Advantageously, as depicted in FIG. 1A, data center 102*a* may be powered by turbine-generator system 106*a* with primary power while backup system 110*a* provides backup power when needed. Both turbine-generator system 106*a* and backup system 110*a* are powered by renewable resources and provide high availability electricity to data center 102*a*. Further, the above ground (i.e., above surface 104*a*) footprint of data center 102*a*, turbine generator system 106*a*, and backup system 110*a* is minimized by leveraging underground (e.g., below surface 104*a*) space for hydrogen storage.

Figure 1B:
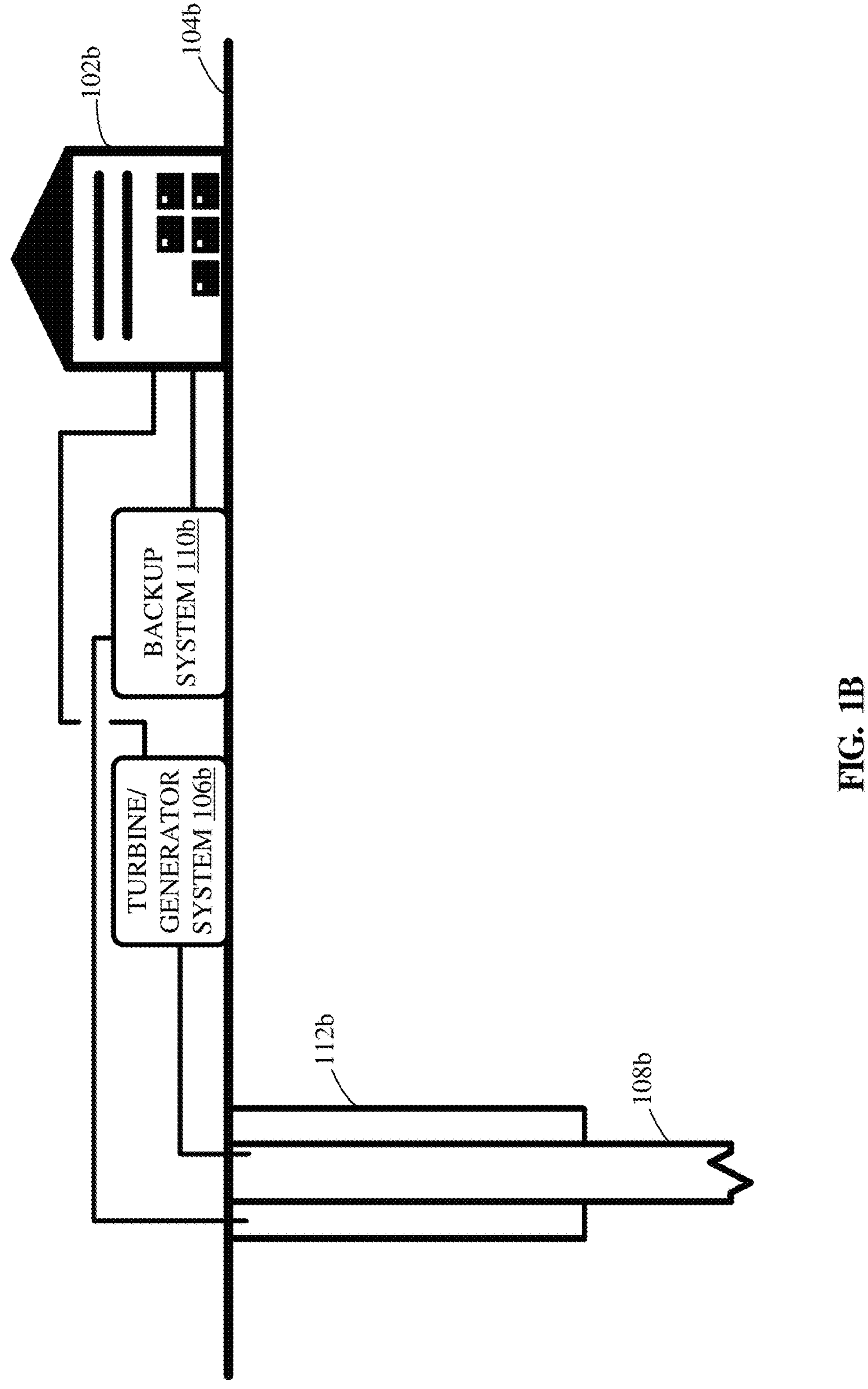

FIG. 1B illustrates hybrid system 100*b* for powering a data center using hybrid, flexible, ecologically friendly fuel sources. Hybrid system 100*b* includes data center 102*b* disposed upon surface 104*b*. Hybrid system 100*b* also includes turbine-generator system 106*b* and backup system 110*b*, each also above ground (i.e., above or on surface 104*b*). Below surface 104*b* is geothermal extraction well 108*b* and underground hydrogen storage 112*b*. Other components and systems may be present in hybrid system 100*b* that are not depicted here for simplicity and clarity.

Hybrid system 100*b* is similar to hybrid system 100*a* with distinctions in positioning of the geothermal extraction well and underground hydrogen storage in each. Data center 102*b* is substantially the same as data center 102*a*. Surface 104*b* is substantially the same as surface 104*a*. Turbine-generator system 106*b* is substantially the same as turbine-generator system 106*a*. Backup system 110*b* is substantially the same as backup system 110*a*. Geothermal extraction well 108*b* is substantially the same as geothermal extraction well 108*a*. Underground hydrogen storage 112*b* is similar to underground hydrogen storage 112*a*. However, underground hydrogen storage 112*b* surrounds geothermal extraction well 108*b*, providing space and initial cost savings.

When forming geothermal extraction well 108*b*, pipe-in-pipe drilling techniques may be used. Pipe-in-pipe drilling is a technique that uses two concentric pipes—an inner pipe and an outer pipe—within the wellbore to improve fluid management and pressure control during drilling operations. Drilling fluid is pumped down the inner pipe to the drill bit, and after cutting through rock formations, the fluid carrying debris returns to the surface through the annular space between the inner and outer pipes. This configuration allows for better management of downhole pressure. By separating the flow paths, operators can fine-tune bottom hole pressure, reduce the risk of well kicks, and strengthen wellbore stability without significantly altering mud weight. Additionally, this technique results in options for maintaining the annular space between the inner pipe and the outer pipe.

Once drilling is complete, the well formed by the inner pipe becomes geothermal extraction well 108*b*, and the annular space between the inner pipe and the outer pipe becomes underground hydrogen storage 112*a*. Space below a depth desired for underground hydrogen storage 112*a* may be filled in with debris that was removed during the drilling process, for example. The drill bit may be removed, but the pipes used during drilling may be left in place or replaced with different pipes to maintain the distinct spaces within the drilling site.

Advantageously, as depicted in FIG. 1B, data center 102*b* may be powered by turbine-generator system 106*b* with primary power while backup system 110*b* provides backup power when needed. Both turbine-generator system 106*b* and backup system 110*b* are powered by renewable resources and provide high availability electricity to data center 102*b*. Further, the above ground (i.e., above surface 104*a*) footprint of data center 102*b*, turbine generator system 106*b*, and backup system 110*b* is minimized by leveraging underground (e.g., below surface 104*a*) space for hydrogen storage. Further, the initial cost and time associated with drilling and creating underground hydrogen storage 112*b* and geothermal extraction well 108*b* are less than the cost of drilling and creating two separate wells as depicted in FIG. 1A. Further, underground space utilization is maximized and the overall impact of well drilling is minimized.

Figure 2:
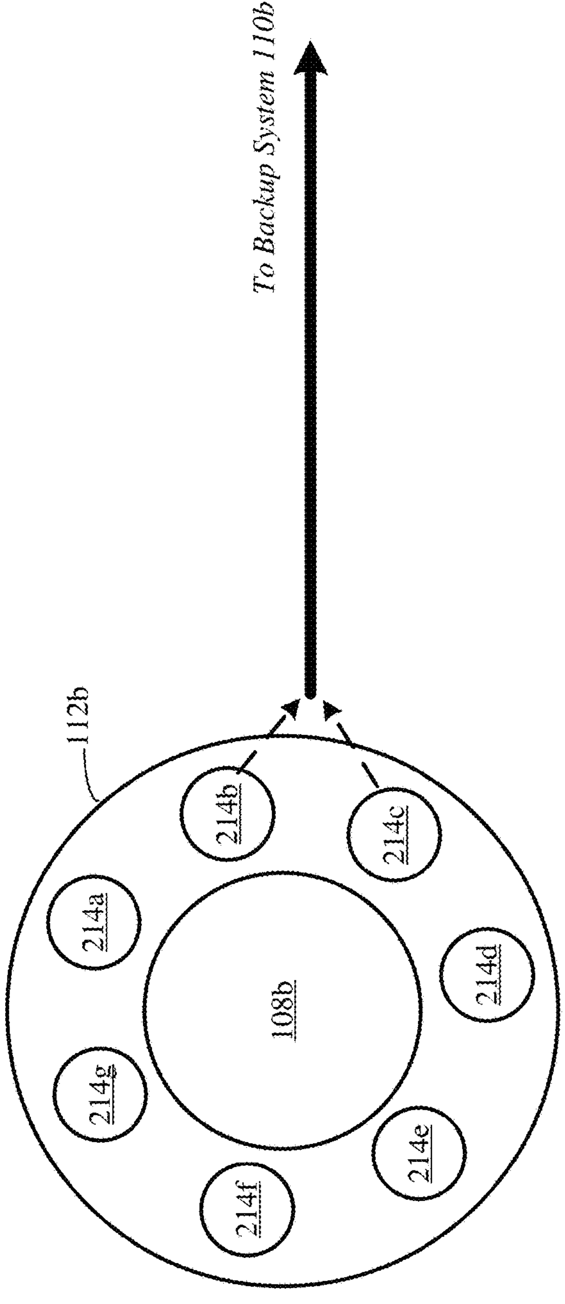
FIG. 2 illustrates a geothermal well and underground hydrogen storage leveraging advantages of pipe-in-pipe drilling technology to minimize space requirements, according to various embodiments.

FIG. 2 illustrates top view 200 of geothermal extraction well 108*b* and underground hydrogen storage 112*b*. Within the annular space created by the inner pipe and the outer pipe during the pipe-in-pipe drilling process (i.e., underground hydrogen storage 112*b*) hydrogen is stored within capped and sealed hydrogen storage tanks 214. In top view 200, seven hydrogen storage tanks are depicted as hydrogen storage tanks 214*a*, 214*b*, 214*c*, 214*d*, 214*e*, 214*f*, 214*g*. However, any number of hydrogen storage tanks 214 may be stored within underground hydrogen storage 112*b*. A system including piping and valves (not depicted in detail here) are used to access the hydrogen within hydrogen storage tanks 214 and sent to backup system 110*b* for use by fuel cells to generate backup electricity for backup power to data center 102*b*.

Figure 3:
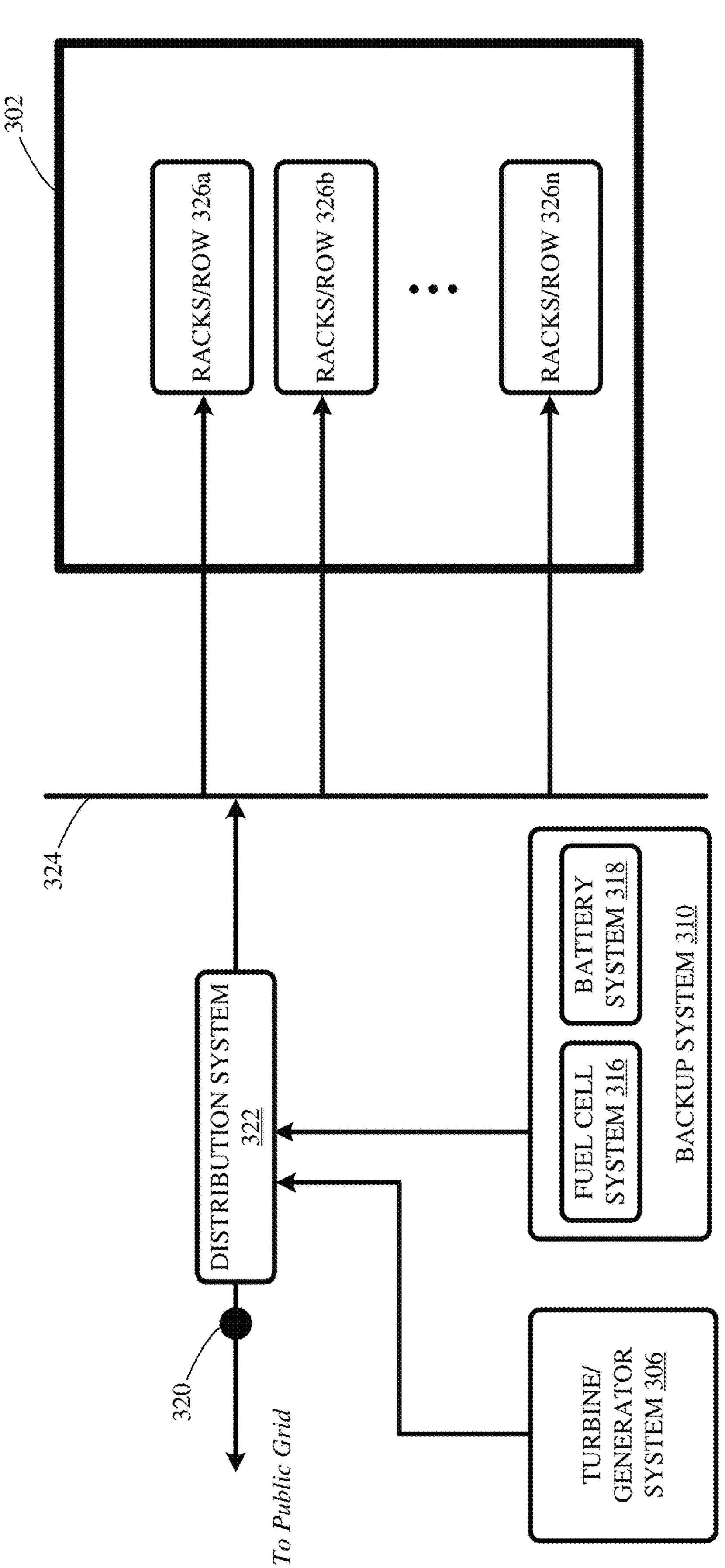
FIG. 3 illustrates additional details of a data center power system, according to various embodiments.

FIG. 3 illustrates hybrid system 300 for powering a data center using hybrid, flexible, ecologically friendly fuel sources. Hybrid system 300 may be generally representative of a hybrid system such as hybrid system 100*a* and 100*b* described with respect to FIGS. 1A and 1B. Hybrid system 300 includes data center 312, power distribution bus 324, distribution system 322, connection 320 to a public grid, turbine-generator system 306 and backup system 310. Hybrid system 300 may include additional components or systems not depicted here for ease of description.

Data center 302 may be generally representative of any data center such as data center 102*a* described with respect to FIG. 1A. Data center 302 includes computing systems (e.g., servers, blade servers, storage devices, and the like) physically arranged in racks, rows, or a combination. The arrangement depicted in FIG. 3 illustrates that a number of racks are arranged into a row, illustrated by racks/row 326*a*, which indicates a single row with a number of racks. There may be any number of rows in data center 302, illustrated by racks/row 326*a*, 326*b*, through 326*n*. Each row may have a connection to power distribution bus 324, which may be powered according to availability level of the row or racks within the row. The availability level may indicate the amount of time data center 302 guarantees the servers in any given rack are guaranteed to be available for processing. In some embodiments, connections to power distribution bus 324 may be by rack, and each rack may have an associated level of availability. For example, a basic level (99.2%) of availability may be less than a high level of availability (e.g., 99.9%). The servers and storage systems in racks/row 326 may be used for any processing and storage needed by the customers and as discussed in more detail with respect to data center 102*a* of FIG. 1A.

Turbine-generator system 306 may be generally representative of a steam turbine generator system such as turbine-generator system 106*a* described with respect to FIG. 1A. In some embodiments, turbine-generator system 306 may include a power conversion unit to ensure electricity provided by turbine-generator system 306 is usable by data center 302. Once generated and converted, turbine-generator system 306 delivers the electricity to distribution system 322.

Backup system 310 may be generally representative of a backup system such as backup system 110*a* described with respect to FIG. 1A. Backup system 310 includes fuel cell system 316 and battery system 318. Fuel cell system 316 may be any system including fuel cells that leverage hydrogen to generate electricity. A fuel cell is an electrochemical device that converts chemical energy directly into electrical energy by combining a fuel (e.g., hydrogen) with an oxidant (e.g., oxygen) without combustion. In an example fuel cell, hydrogen is supplied to the anode and oxygen is supplied to the cathode. The hydrogen and oxygen combine to generate heat, water, and electricity. The heat generated during the process can be used in heat reuse applications as discussed with respect to FIG. 5. In addition to the fuel cell, of which there may be many to generate sufficient electricity, there may be additional components including one or more power conversion units and the like to ensure the electricity delivered by fuel cell system 316 is usable by data center 302.

Battery system 318 may include one or more batteries, which may be a rechargeable battery, such as a lithium-ion battery or the like. Battery system 318 may further include one or more power conversion units to ensure the electricity delivered by battery system 318 is usable by data center 302. In some embodiments, the power conversion units of battery system 318 and fuel cell system 316 convert the electricity for transfer to other power conversion units over, for example, a DC bus. In some embodiments, battery system 318 may be optional as battery system 318 provides transitional backup electricity while fuel cell system 316 starts up. Once fuel cell system 316 is operating at steady state, battery system 318 may be disconnected. For example, battery system 318 may include a switch that is opened or closed by a controller to start and stop the flow of the transitional backup electricity from battery system 318.

Once the electricity is converted for use, backup system 310 delivers the backup electricity (i.e., backup power) to distribution system 322.

Distribution system 322 may include both controllers as well as circuitry and cabling to distribute the primary electricity from turbine-generator system 306 and from backup system 310 over power distribution bus 324 to the appropriate racks/row 326 of data center 302. Distribution system 322 may throttle, route, and/or direct the power to all racks/rows 326 based on the amount of power available to distribute. For example, distribution system 322 may treat all racks/rows 326 as one high availability cluster. In some embodiments, distribution system 322 may throttle, route, and/or direct the power to particular racks/row 326 based on the amount of power available to distribute and the particular racks/row 326 associated level of availability. For example, if there is a disruption in primary power from turbine-generator system 306. While backup system 310 initiates to provide backup power, there may be insufficient power to provide sufficient power to all of racks/row 326. For example, racks/row 326*a* may have a high availability level associated with it, and racks/row 326*b* may have a basic availability level associated with it. In such an example, distribution system 322 will direct the available power to racks/row 326*a* and only if sufficient power is available after ensuring racks/row 326*a* is powered will distribution system 322 distribute power to racks/row 326*b*. In other words, distribution system 322 distributes power to racks/rows 326 based on their associated level of availability. As one example, racks/row 326*a* may be an Information Technology (IT) rack that may need a higher priority or availability than other racks/rows 326*b-n* in the data center. Accordingly, power may be distributed to racks/row 326*a* with higher priority than other racks/rows 326*b-n*.

In some embodiments, as depicted in FIG. 3, distribution system 322 may include a connection 320 to a public grid. While connection 320 may be used as another form of backup power if a disruption in primary power from turbine-generator system 306 and a disruption in backup power from backup system 310 were to occur, connection 320 may instead be used to feed excess electricity from hybrid system 300 into the public grid. For example, if a controller in distribution system 322 detects the level of primary electricity generated by turbine-generator system 306 exceeds the power needs of data center 302, the controller may open connection 320 to feed excess electricity to the public grid.

Figure 4:
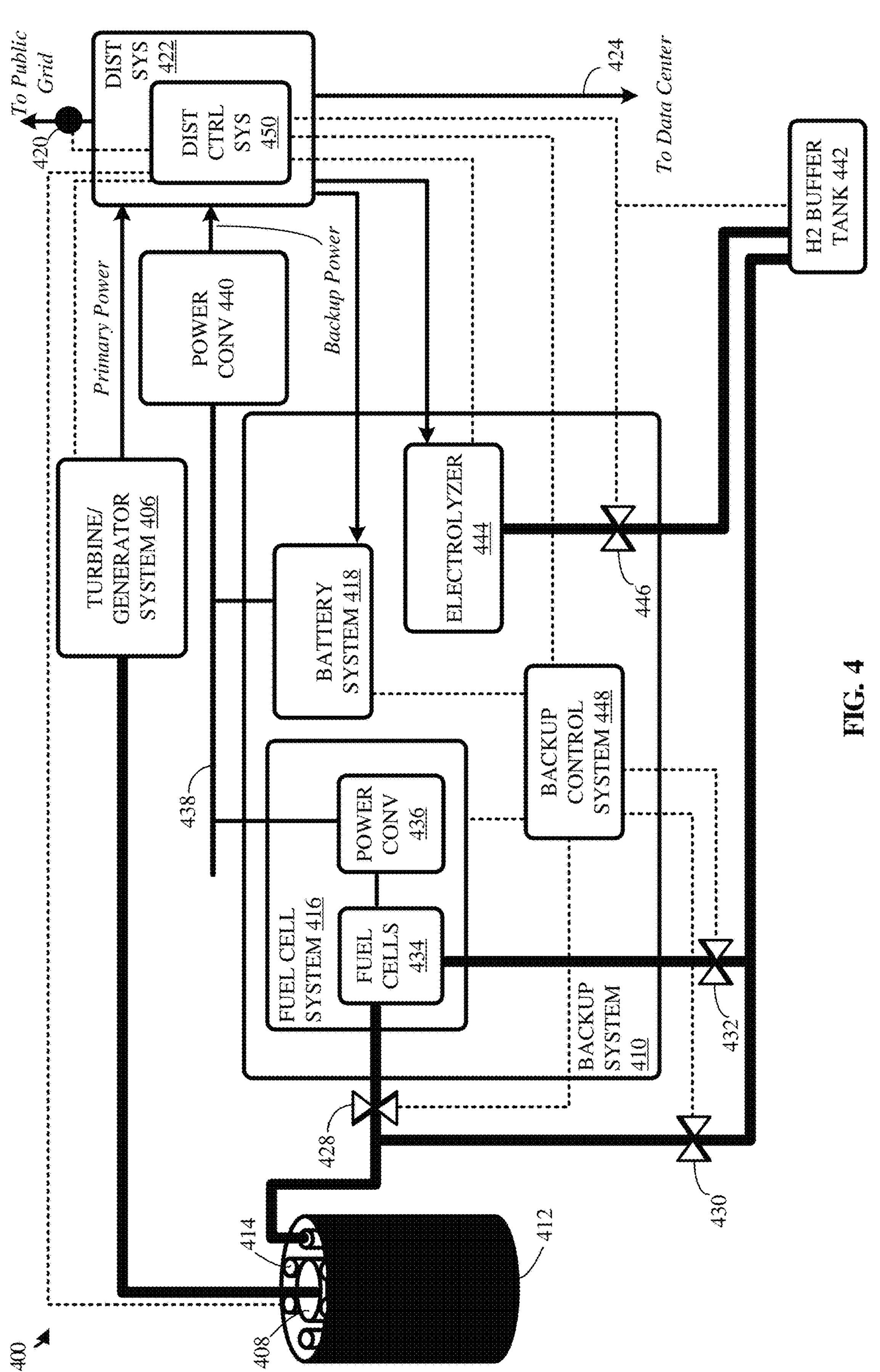
FIG. 4 illustrates further details of a data center power system, according to various embodiments.

FIG. 4 illustrates an example hybrid system 400 for powering a data center using hybrid, flexible, ecologically friendly fuel sources. Hybrid system 400 may be generally representative of a hybrid system such as hybrid system 100*a*, 100*b*, or 300 described with respect to FIGS. 1A, 1B, and 3. Hybrid system 400 may include more components not described or shown here for simplicity.

Hybrid system 400 includes turbine-generator system 406 coupled to geothermal extraction well 408. The coupling includes a piping system that pipes steam (i.e., geothermal energy) out of geothermal extraction well 408 to turbine-generator system 406. Geothermal extraction well 408 is generally representative of any well used for extracting geothermal energy (i.e., heat) such as geothermal extraction well 108*a* and 108*b* described with respect to FIGS. 1A, 1B, and 2. Underground hydrogen storage 412 encloses hydrogen tanks 414, which may be generally representative of underground hydrogen storage in hydrogen tanks such as underground hydrogen storage 112*a*, 112*b*, and 312 and hydrogen tanks 212 as depicted in the preceding FIGS. While geothermal extraction well 408 is depicted similar to geothermal extraction well 108*b*, with underground hydrogen storage 412 surrounding it, underground hydrogen storage 412 may be separated from geothermal extraction well 408 as depicted with respect to FIG. 1A. Further, while hydrogen tanks 414 are depicted, in some embodiments, hydrogen may be stored in underground hydrogen storage 412 without being encased in tanks.

Turbine-generator system 406 is generally representative of any steam turbine system such as turbine generator system 106*a*, 106*b*, or 306 described with respect to FIGS. 1A, 1B, and 3. While not shown, turbine-generator system 406 may include a power conversion component such as an inverter, transformer, converter, or the like to ensure the primary power sent from turbine-generator system 406 to distribution system 422 is usable by the data center (e.g., data center 102*a*, 102*b*, 302).

Hybrid system 400 further includes backup system 410. Backup system 410 may be generally representative of a backup system such as backup system 110*a*, 110*b*, or 300 as described with respect to FIGS. 1A, 1B, and 3. Backup system 410 includes fuel cell system 416, battery system 418, electrolyzer 444, and backup control system 448. Backup system 410 may include additional components not shown or described here for simplicity.

Fuel cell system 416 may be generally representative of any fuel cell system such as fuel cell system 316 described with respect to FIG. 3. Fuel cell system 416 includes fuel cells 434 and power conversion unit 436. Fuel cells 434 may be one or more fuel cells that use hydrogen to generate electricity, which serves as backup electricity for the data center. Fuel cells 434 are coupled to the hydrogen tanks 414 within underground hydrogen storage 412 via a pipe though which the hydrogen flows when valve 428 is opened. Fuel cells 434 generate electricity, which is sent to power conversion unit 436 for conversion to transmit over DC bus 438. Power conversion unit 436 may be, for example, a transformer, an inverter, a converter, or the like to ensure the electricity output by fuel cell system 416 can be transmitted over DC bus 438.

Battery system 418 may be generally representative of any battery system such as battery system 318 described with respect to FIG. 3. Battery system 418 may include a switch that connects or disconnects battery system 418 to or from DC bus 438. Battery system 418 may include one or more rechargeable (e.g., lithium-ion) batteries that store charge for use as transitional backup electricity while fuel cell system 416 starts up and reaches steady state operation. Battery system 418 may include one or more power conversion units (not shown) that may include a transformer, an inverter, a converter, or the like used to ensure the electricity from battery system 418 can be transmitted over DC bus 438.

Figure 8:
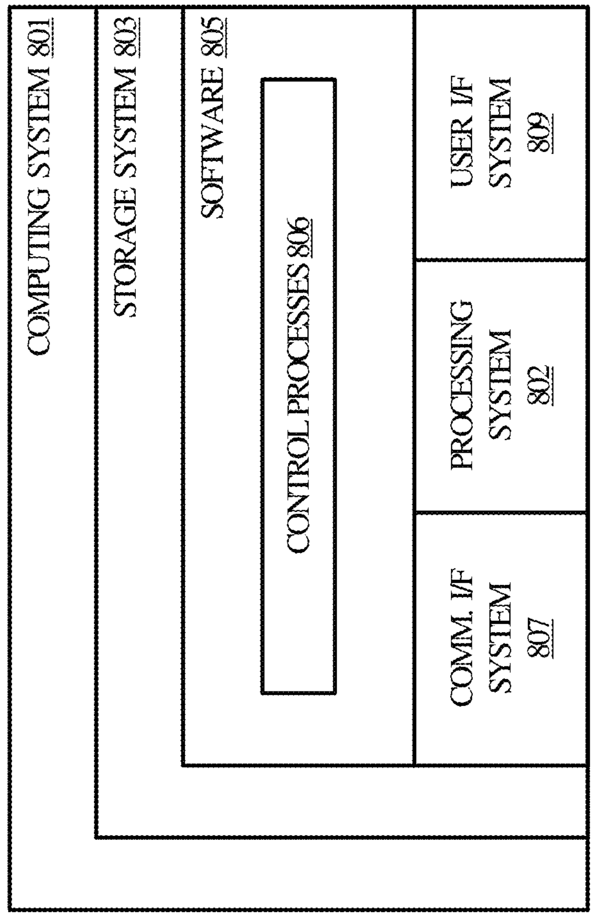
FIG. 8 illustrates a computing system suitable for implementing the various operational environments, architectures, processes, scenarios, and sequences discussed below with respect to the other Figures.

Backup control system 448 may be any control system that includes one or more controllers or computing systems such as, for example, computing device 801 described with respect to FIG. 8. Backup control system 448 may control operation of backup system 410 as a portion of an overall control system that controls hybrid system 400. Backup control system 448 may instruct valves 428, 430, and 432 to open or close based on particular circumstances described herein. Further, backup control system 448 may communicate with distribution control system 450 as part of the overall control system of hybrid system 400. Further, backup control system 448 may instruct fuel cell system 416 to start up (i.e., initiate operation) or shut down (i.e., terminate operation) based on communications received from distribution control system 450. Similarly, backup control system

448 may transmit signals to open and close the switch or otherwise initiate or terminate operation of battery system 418. Such a flow of signals and instructions are provided further below as well as with respect to descriptions of FIGS. 6 and 7.

Electrolyzer 444 may be used to generate hydrogen for filling hydrogen buffer tank 442 and/or hydrogen tanks 414. An electrolyzer is a device that uses electrical energy to drive a chemical reaction. Electrolyzer 444 splits water into hydrogen and oxygen gases. This process is called electrolysis. Electrolyzer 444 is an optional component to hybrid system 400, but it may be used to provide green hydrogen using excess electricity generated by turbine-generator system 406 as described further below.

DC bus 438 may be an electrical power bus configured to transmit direct current (DC) power from backup system 410 to power conversion unit 440. DC bus 438 maintains a steady voltage level, so power conversion units in backup system 410 such as power conversion unit 436 and any power conversion unit in battery system 418 may convert the power generated by the respective component (e.g., fuel cells 434 or the battery in battery system 418) to meet the requirements of DC bus 438.

Power conversion unit 440 may be an inverter, transformer, or the like used to convert electricity from DC bus 438 to the backup power accepted by distribution system 422.

Distribution system 422 is generally representative of any distribution system for distributing power to a data center (e.g., data center 102*a*, 102*b*, 302) over power distribution bus 424. Power distribution bus 424 may be generally representative of any suitable power distribution bus such as power distribution bus 324 described with respect to FIG. 3. Distribution system 422 may ensure primary power and backup power is distributed to racks and/or rows of the data center based on associated levels of availability. Distribution system 422 may include distribution control system 450.

Distribution control system 450 may be any control system that includes one or more controllers or computing systems such as, for example, computing device 801 described with respect to FIG. 8. Distribution control system 450 may control the operation of distribution system 422 as a portion of an overall control system that controls hybrid system 400. Distribution control system 450 may monitor the available primary power and backup power based on, for example, current or voltage sensors (not shown). Such monitoring allows distribution control system 450 to detect interruptions or disruptions in primary power and backup power as well as make decisions on how to route available power to the data center over power distribution bus 424. Further, distribution control system 450 may monitor levels of geothermal energy from geothermal extraction well 408 and levels of hydrogen available in hydrogen tanks 414 and hydrogen buffer tank 442 using sensors such as thermal sensors at geothermal extraction well 408 and tank level sensors at hydrogen tanks 414 and hydrogen buffer tank 442. Distribution control system 450 may initiate backup power by communicating with backup control system 448 and may distribute excess electricity generated by hybrid system 400 using communication with valve 446, electrolyzer 444, backup control system 448, and connection 420 to public grid.

Connection 420 to public grid may be representative of a connection to a public grid such as connection 320 to public grid described with respect to FIG. 3. Connection 420 may be opened or closed based on signals from distribution control system 450. For example, in the event of excess electricity at distribution system 422, distribution control system 450 may open connection 420 to feed excess electricity (i.e., electricity beyond the demand of the data center) to the public grid. Optionally, connection 420 may be used to receive electricity from the public grid in the event of a catastrophic failure of both turbine generator system 406 and backup system 410.

Hydrogen buffer tank 442 may store additional hydrogen in a separate storage location. For example, ten percent (10%) of the amount of hydrogen stored in underground hydrogen storage 412 may be stored in hydrogen buffer tank 442 to cover a situation in which hydrogen in underground hydrogen storage 408 is unavailable (e.g., system failure, pipe blockage, valve failure, or the like). Hydrogen buffer tank 442 may provide a backup source of hydrogen stored separately. Hydrogen buffer tank 442 may be above ground or below ground. Hydrogen buffer tank 442 may store gaseous or liquid hydrogen. Liquid hydrogen requires cold temperatures, so various components may be needed that are not shown to maintain the proper temperature if hydrogen is stored in liquid form in hydrogen buffer tank 442.

The following operational scenarios may be handled by hybrid system 400.

Normal Operation

During normal operation, turbine-generator system 406 receives steam from geothermal extraction well 408 via a pipe and converts the steam into electricity served to distribution system 422 as primary power. Distribution control system 450 may monitor temperatures at geothermal extraction well 408, sensors indicating the operation of turbine-generator system 406, and current and/or voltage of the primary power received at distribution system 422. Distribution control system 450 may ensure primary power is distributed appropriately over power distribution bus 424 to the data center. In normal operation, the primary power generated by turbine-generator system 406 meets or exceeds the needs of the data center.

Backup Power Initiation

During normal operation, events may occur that create a disruption in the primary power received at distribution system 422. Distribution control system 450 may detect the disruption in power and initiate backup power operations by notifying backup control system 448. Backup control system 448 initiates startup of fuel cell system 416 by sending a signal to fuel cell system 416 to initiate operation. Backup control system 448 also sends a signal opening valve 428. Fuel cells 434 begin receiving hydrogen from hydrogen tanks 414 in underground hydrogen storage 412 through the pipe once valve 428 is opened. Fuel cells 434 use hydrogen to generate electricity and send the electricity to power conversion unit 436. Power conversion unit 436 converts the electricity from fuel cells 434 to match the expected voltage on DC bus 438. The electricity is transmitted over DC bus 438 to power conversion unit 440. Power conversion unit 440 converts the power (e.g., transforms the DC power to AC power at a particular frequency and voltage) and serves it as backup power to distribution system 422. Distribution control system 450 ensures the backup power is distributed to the data center over power distribution bus 424 to the racks and rows of the data center based on associated levels of availability. When distribution control system 450 detects that primary power has resumed from turbine-generator system 406, it sends another signal to backup control system 448 indicating that primary power has resumed. Backup control system 448 sends a signal to fuel cell system 416 to terminate operation and sends a signal to valve 428 to close. During operation, when a hydrogen tank 414 is used, a controller (e.g., a controller in distribution control system 450) may send signals to close and open valves (not shown) to switch which hydrogen tank 414 is providing the hydrogen to fuel cells 434. In some embodiments, rather than distribution control system 450 monitoring hydrogen levels in hydrogen tanks 414 and controlling the valves to switch the source between various hydrogen tanks 414, backup control system 448 may perform those functions. Additionally, if all of hydrogen tanks 414 are depleted, backup control system may close valve 428 and open valve 432 to allow hydrogen to flow from hydrogen buffer tank 442 to fuel cells 434 to be used for generating backup power.

Transitional Backup Power Initiation

In some embodiments, when backup control system 448 receives the instruction to initiate backup power, in addition to instructing fuel cell system 416 to being operation, backup control system 448 may send a signal to battery system 418 to initiate transitional backup power. For example, backup control system 448 may transmit a signal to close a switch in battery system 418 that closes a circuit to connect battery system 418 to DC bus 438. Battery system 418 then transmits energy (i.e., electricity) stored in the battery to DC bus 438 after performing any power conversion on the stored energy. Once fuel cell system 416 is operating at steady state, which backup control system 448 may monitor or which distribution control system 450 may monitor based on, for example, backup power received at distribution system 422, backup control system 448 may send a signal to battery system 418 to stop generating transitional backup power. For example, backup control system 448 may transmit a signal to open the switch to disconnect battery system 418 from DC bus 438.

Excess Primary Power

During normal operation or even during backup power operation, distribution control system 450 may determine the power consumption needs of the data center are less than the primary power and/or backup power received at distribution system 422. In response to detecting such excess power, distribution control system 450 may make adjustments to hybrid system 400 to handle the excess power.

Slow Down Electric Production

In some embodiments or in certain circumstances, upon detecting excess power at distribution system 422, distribution control system 450 may transmit a signal to turbine-generator system 406 or backup control system 448 to reduce electrical production. Particularly when the power is coming from backup power, it may be undesirable to generate excess electricity and instead limit the use of the hydrogen used to generate the backup power. In response to the signal, turbine-generator system 406 or backup system 410 may slow production of the primary or backup power.

Send Excess Power to the Public Grid

In some embodiments or in certain circumstances, upon detecting excess power at distribution system 422, distribution control system 450 may open connection 420 to allow excess electricity to flow to the public grid. Such excess electricity may be used to help provide credits for needy families, for example.

Use Excess Electricity to Generate Hydrogen with Electrolyzer 444

In some embodiments or in certain circumstances, upon detecting excess power at distribution system 422, distribution control system 450 may check hydrogen levels in hydrogen tanks 414, hydrogen buffer tank 442, or both. Upon determining the level of hydrogen in hydrogen buffer tank 442 is below full, distribution control system may transmit a signal to electrolyzer 444 to initiate operation and direct the excess electricity to electrolyzer 444 to use to generate new hydrogen. Distribution control system 450 may also transmit a signal to valve 446 to open so that the new hydrogen may flow through the pipe to hydrogen buffer tank 442. If hydrogen tanks 414 are not full, backup control system 448 may receive a signal from distribution control system 450 to send a signal to valve 430 to open to allow hydrogen to flow from hydrogen buffer tank 442 to fill hydrogen tanks 414. In some embodiments, distribution control system 450 includes a communication link with valve 430 to send the instruction directly from distribution control system 450 to valve 430, bypassing backup control system 448. Once all hydrogen tanks 414 are full, backup control system 448 or distribution control system 450 may send a signal to valve 430 to close. Once hydrogen buffer tank 442 is full, distribution control system 450 may send a signal to valve 446 to close and a signal to electrolyzer 444 to terminate operation. Distribution control system 450 may further stop distributing excess electricity to electrolyzer 444.

Use Excess Electricity to Charge Battery in Battery System 418

In some embodiments or in certain circumstances, upon detecting excess power at distribution system 422, distribution control system 450 may determine one or more batteries in battery system 418 is not fully charged. For example, distribution control system 450 may include a link (not shown) to sensor within battery system 418 that may provide the charge state of the batteries. Alternatively, backup control system 448 may provide the charge state information to distribution control system 450. If excess electricity is generated by fuel cell system 416, backup control system 448 may receive a signal from distribution control system 450 to put battery system in a charging state to charge the batteries using power from DC bus 438. If excess electricity is generated by turbine generator system 406 as primary power, distribution control system 450 may instruct backup control system to put battery system 418 in a charging state and distribute the excess electricity to battery system 418 through a charging connection.

Advantageously, hybrid system 400 may be a fully functional powering system for providing high availability power to a data center without reliance on fossil fuels or a public grid.

Figure 5:
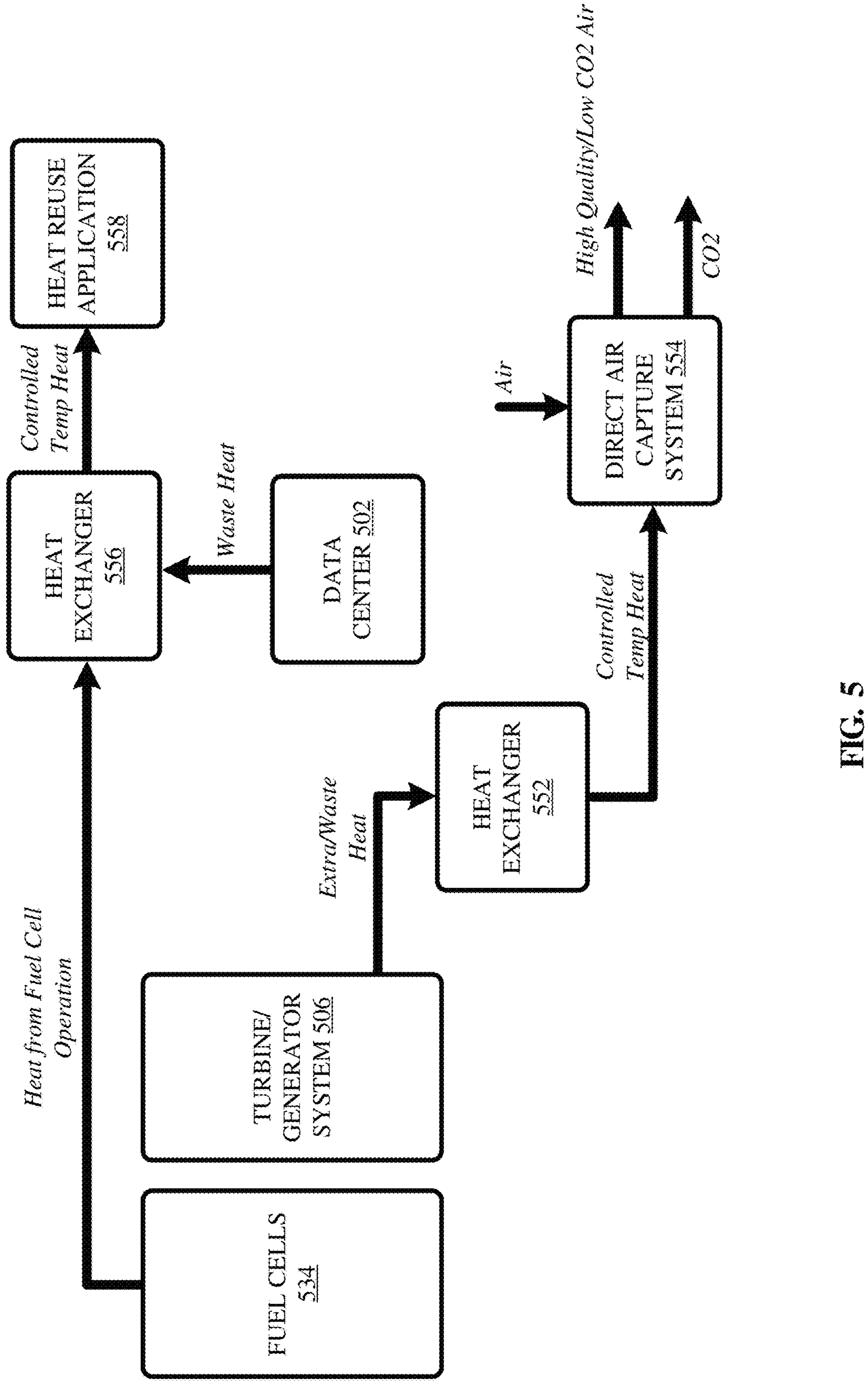
FIG. 5 illustrates various thermal waste reuse systems of data center power systems, according to various embodiments.

FIG. 5 illustrates an example hybrid system 500 for powering a data center using hybrid, flexible, ecologically friendly fuel sources. Hybrid system 500 may be generally representative of a hybrid system such as hybrid system 100*a*, 100*b*, 300, or 400 described with respect to FIGS. 1A, 1B, 3, and 4. Hybrid system 500 may include more components not described or shown here for simplicity. Hybrid system 500 includes fuel cells 534, turbine-generator system 506, data center 502, heat exchanger 556, heat reuse application 558, heat exchanger 552, and direct air capture system 554.

Data center 502 is generally representative of any data center such as data center 102*a*, 102*b*, and 302. Fuel cells 534 are generally representative of any fuel cells such as fuel cells 434 of fuel cell system 416 described with respect to FIG. 4. When fuel cells 534 generate electricity using hydrogen, heat is produced. This heat may be captured and transmitted to heat exchanger 556. Heat exchanger 556 is a device that transfers thermal energy between two or more fluids (liquids or gases) without mixing them. It works by bringing the fluids into close contact across a solid surface, such as metal plates or tubes, allowing heat to flow from the hotter fluid to the cooler one. Depending on the design, the fluids may flow in the same direction (parallel flow), opposite directions (counterflow), or cross paths (crossflow) to maximize heat transfer efficiency. Heat exchanger 556 may receive hot air (gas) or hot water (liquid) from fuel cells 534. Heat exchanger 556 can transfer the heat from the hot air or water to a different gas or liquid at a controlled temperature to output to heat reuse application 558. Heat exchanger 556 may also receive waste heat (e.g., hot air) from data center 502 and use that waste heat to generate further controlled temperature air or water to heat reuse application 558. In some embodiments, heat exchanger 556 includes multiple heat exchangers to handle heat from fuel cells 534 separately from the waste heat from data center 502. Heat reuse application 558 may be a community heating system (e.g., to heat homes, businesses, or public buildings), greenhouse heating, a direct air capture system, or the like.

Turbine-generator system 506 is generally representative of any turbine-generation system such as turbine generation system 106*a*, 106*b*, 306, or 406 described with respect to FIGS. 1A, 1B, 3, and 4. Thermal energy from the geothermal extraction well feeding turbine-generator system 506 may provide more thermal energy than turbine-generator system 506 can use. Further, the process of converting the thermal energy to electricity may result in wasted thermal energy (i.e., waste heat). This extra and/or waste heat can be piped to heat exchanger 552. Heat exchanger 552 may be substantially the same as heat exchanger 556 in that it transfers heat between two liquids without mixing the liquids. Heat exchanger 552 may output controlled temperature heat that may be used by direct air capture system 554. Direct air capture systems use heat to remove carbon dioxide from ambient air to produce high quality/low carbon dioxide air. Therefore, direct air capture 554 can improve air quality using the waste heat captured and exchanged by heat exchanger 552. Direct air capture system 554 uses fans to pull ambient air through a chemical contactor. The chemical contactor may use liquid solvents or solid sorbents. Once the sorbent or solvent becomes saturated with carbon dioxide, it is heated to release pure carbon dioxide. The released carbon dioxide is captured and can be used for other purposes or stored. The air resulting from the process is higher quality having low carbon dioxide. In some embodiments, a different heat reuse application than direct air capture system 554 may be used to leverage the extra and waste heat from turbine-generator system 506.

FIG. 6 illustrates a method 600 for providing hybrid, flexible, and geologically friendly power to a data center. Method 600 may be performed by hybrid systems 100*a*, 100*b*, 300, 400, and 500. Method 600 may include more steps than depicted and the steps may be performed in any order without departing from the scope of the disclosure. Method 600 begins with step 602 where geothermal energy is extracted via a geothermal extraction well. For example, geothermal energy (e.g., steam, heat) is extracted from geothermal extraction well (e.g., geothermal extraction well 108*a*, 108*b*, 308, 408). At step 604, hydrogen is stored in an underground hydrogen storage. For example, hydrogen may be stored in underground hydrogen storage (e.g., underground hydrogen storage 112*a*, 112*b*, 312, 412) separately from or surrounding the geothermal extraction well. At step 606, a turbine-generator system is used to generate primary electricity for the data center from the geothermal energy. The turbine-generator system (e.g., turbine-generator system 106*a*, 106*b*, 306, 406, 506) converts the geothermal energy (e.g., steam) into electricity with a steam turbine coupled to a generator. At step 608, the primary electricity from the turbine-generator system is served to the data center as primary power of the data center. For example, a distribution system (e.g., distribution system 322, 422) distributes the power over a power distribution bus (e.g., power distribution bus 324, 424) to racks and rows (e.g., racks/rows 326) of the data center (e.g., data center 102*a*, 102*b*, 302, 502). In some embodiments, the power is distributed based on an availability level associated with the particular racks and/or rows of the data center. At step 610, in response to detecting a disruption in the primary power of the data center, hydrogen is allowed to flow to a fuel cell, operation of the fuel cell is initiated to generate backup electricity, and the backup electricity is served to the data center as backup power. For example, in response to distribution control system 430 detecting a disruption in primary power from turbine-generator system 406, distribution control system 450 transmits a signal to backup control system 448 indicating backup power is needed. Backup control system 448 sends a signal to valve 428 to open and a signal to fuel cell system 416 to initiate operation. Fuel cell system 416 begins generating backup electricity using hydrogen from hydrogen tanks 414 flowing through valve 428 to fuel cells 434. Power conversion unit 436 converts the electricity to transmit over DC bus 438, and power conversion unit 440 converts the electricity from DC bus 438 to be backup power compatible with and available for distribution by distribution system 422. Distribution system 422 distributes the backup power to racks and/or rows of the data center (e.g., data center 102*a*, 102*b*, 302, 502). In some embodiments, the backup power is distributed based on the level of availability associated with the given racks and/or rows (e.g., racks/row 326).

Figure 7:
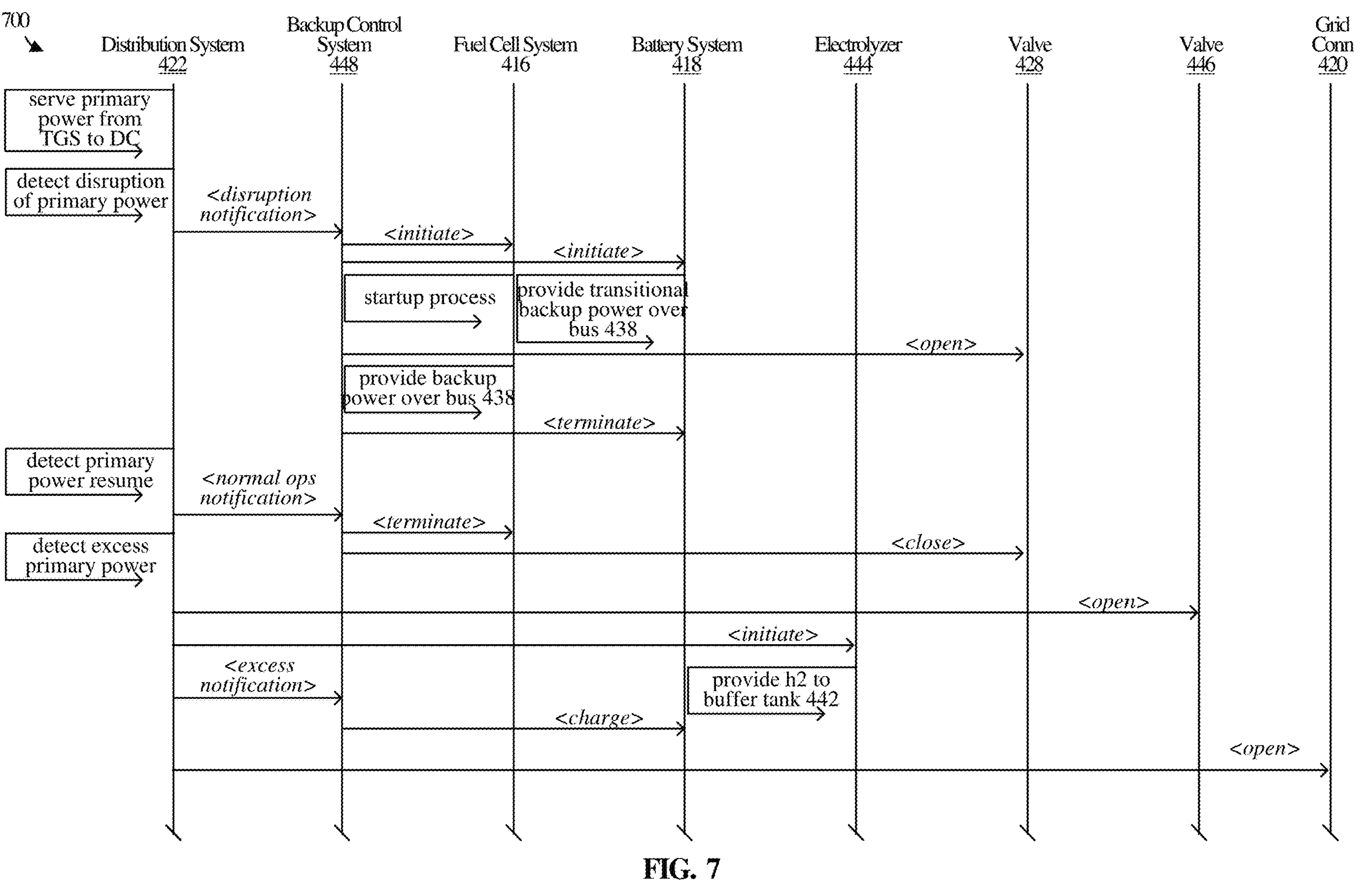
FIG. 7 illustrates an operational scenario of a data center power system, according to various embodiments.

FIG. 7 illustrates an operational scenario 700 of hybrid system 400. During normal operation, distribution system 422 serves primary power from turbine-generator system 406 to the data center (e.g., data center 102*a*, 102*b*, 302, 502). Distribution control system 450 within distribution system 422 may detect disruption of primary power. For example, a sensor within turbine-generator system 406 may indicate an issue. As another example, current and/or voltage sensors may detect a disruption or interruption of primary electricity from turbine-generator system 406.

In response to detecting the disruption, distribution control system 450 of distribution system 422 sends a disruption notification to backup control system 448. Backup control system 448, in response to the disruption notification, transmits an initiate signal to fuel cell system 416, an initiate signal to battery system 418, and a signal to valve 428 to open. The initiate signal to fuel cell system 416 may be to a processor or controller within fuel cell system that initiates a startup process to start generating electricity with fuel cells 434 using the hydrogen now able to flow from hydrogen tanks 414 through open valve 428. The initiate signal to battery system 418 may, for example, close a switch to electrically couple battery system 418 to DC bus 438. While connected, battery system 418 provides transitional backup power over DC bus 438, which may optionally be used during the startup process of fuel cell system 416. Once fuel cell system 416 reaches stead state operation and is providing backup power over DC bus 438, backup control system 448 sends a terminate signal to battery system 418. For example, the terminate signal may close the switch connecting battery system 418 to DC bus 438.

At some point during operation in backup mode, distribution control system 450 in distribution system 422 detects that primary power resumes from turbine-generator system 406. In response to detecting normal operation may resume using primary power from turbine-generator system 406, distribution control system 450 within distribution system 422 transmits a normal operation signal to backup control system 448. In response to receiving the normal operation signal, backup control system 448 sends a terminate signal to fuel cell system 416 and a close signal to valve 428 to stop fuel cell system 416 from generating backup electricity and using hydrogen from hydrogen tanks 414.

Later still during normal operation, distribution control system 450 in distribution system 422 detects excess primary power is being generated. For example, turbine-generator system 406 is generating more electricity than the data center is demanding. In response to detecting excess power, and in response to determining the hydrogen level in hydrogen buffer tank and/or hydrogen tanks 414 are below full, distribution control system 450 transmits an open signal to valve 446 and an initiate signal to electrolyzer 444. Not shown, if hydrogen tanks 414 are below full, an open signal may also be sent to valve 430 so that excess hydrogen from electrolyzer 444 can flow from buffer tank 442 to hydrogen tanks 414. Once hydrogen tanks 414 are full, a close signal is transmitted to valve 430, and once buffer tank 442 is full, a close signal is sent to valve 446 and a terminate signal is sent to electrolyzer 444. The signals sent to valve 430 may be from distribution control system 450 directly or through backup control system 448 if no direct link exists between valve 430 and distribution control system 450.

Instead of or in addition to the generation of new hydrogen with the excess electricity, distribution control system 450 of distribution system 422 may provide an excess notification to backup control system 448. Backup control system 448 may, in response, send a charge signal to battery system 418, which may initiate a charging circuit of battery system 418. For example, the charge signal may close a switch that connects a battery in battery system 418 to a charging circuit coupled to a current source into which distribution system 422 directs some or all of the excess electricity to charge the batteries in battery system 418.

Instead of or in addition to the generation of new hydrogen or the charging of batteries in battery system 418 with excess electricity, distribution control system 450 of distribution system 422 may send a signal to grid connection 420 to connect distribution system 422 to a public grid. Distribution system 422 may direct some or all of the excess electricity to the public grid via connection 420. The excess electricity to the public grid may be used to provide credits for community public grid customers, to needy families in the community, or the like.

FIG. 8 illustrates computing device 801 that is representative of any system or collection of systems in which the various processes, programs, services, and scenarios disclosed herein may be implemented. Examples of computing device 801 include, but are not limited to, desktop and laptop computers, tablet computers, mobile computers, and wearable devices. Examples may also include server computers, web servers, cloud computing platforms, and data center equipment, as well as any other type of physical or virtual server machine, container, and any variation or combination thereof. Accordingly, servers, computing systems, or controllers within backup control system 448 and distribution control system 450 may be computing device 801. Further, computing systems operating within data centers (e.g., data center 102*a*, 102*b*, 302, 502) may be computing device 801.

Computing device 801 may be implemented as a single apparatus, system, or device or may be implemented in a distributed manner as multiple apparatuses, systems, or devices. Computing device 801 includes, but is not limited to, processing system 802, storage system 803, software 805, communication interface system 807, and user interface system 809 (optional). Processing system 802 is operatively coupled with storage system 803, communication interface system 807, and user interface system 809.

Processing system 802 loads and executes software 805 from storage system 803. Software 805 includes and implements control processes 806, which is (are) representative of the control processes discussed with respect to the preceding figures, such as method 600 and operational scenario 700. When executed by processing system 802, software 805 directs processing system 802 to operate as described herein for at least the various processes, operational scenarios, and sequences discussed in the foregoing implementations. Computing device 801 may optionally include additional devices, features, or functionality not discussed for purposes of brevity.

Referring still to FIG. 8, processing system 802 may comprise a microprocessor and other circuitry that retrieves and executes software 805 from storage system 803. Processing system 802 may be implemented within a single processing device but may also be distributed across multiple processing devices or sub-systems that cooperate in executing program instructions. Examples of processing system 802 include general purpose central processing units, graphical processing units, application specific processors, and logic devices, as well as any other type of processing device, combinations, or variations thereof.

Storage system 803 may comprise any computer readable storage media readable by processing system 802 and capable of storing software 805. Storage system 803 may include volatile and nonvolatile, removable and non-removable media implemented in any method or technology for storage of information, such as computer readable instructions, data structures, program modules, or other data. Examples of storage media include random access memory, read only memory, magnetic disks, optical disks, flash memory, virtual memory and non-virtual memory, magnetic cassettes, magnetic tape, magnetic disk storage or other magnetic storage devices, or any other suitable storage media. In no case is the computer readable storage media a propagated signal.

In addition to computer readable storage media, in some implementations storage system 803 may also include computer readable communication media over which at least some of software 805 may be communicated internally or externally. Storage system 803 may be implemented as a single storage device but may also be implemented across multiple storage devices or sub-systems co-located or distributed relative to each other. Storage system 803 may comprise additional elements, such as a controller, capable of communicating with processing system 802 or possibly other systems.

Software 805 (including control processes 806) may be implemented in program instructions and among other functions may, when executed by processing system 802, direct processing system 802 to operate as described with respect to the various operational scenarios, sequences, and processes illustrated herein. For example, software 805 may include program instructions for implementing control processes such as opening and closing valves and sending signals to various components and systems as described herein.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 805 may include additional processes, programs, or components, such as operating system software, virtualization software, or other application software. Software 805 may also comprise firmware or some other form of machine-readable processing instructions executable by processing system 802.

In general, software 805 may, when loaded in to processing system 802 and executed, transform a suitable apparatus, system, or device (of which computing device 801 is representative) overall from a general-purpose computing system into a special-purpose computing system customized to support control processes in an optimized manner. Indeed, encoding software 805 on storage system 803 may transform the physical structure of storage system 803. The specific transformation of the physical structure may depend on various factors in different implementations of this description. Examples of such factors may include, but are not limited to, the technology used to implement the storage media of storage system 803 and whether the computer-storage media are characterized as primary or secondary storage, as well as other factors.

For example, if the computer readable storage media are implemented as semiconductor-based memory, software 805 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 807 may include communication connections and devices that allow for communication with other computing systems (not shown) over communication networks (not shown). Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

Communication between computing device 801 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses and backplanes, or any other type of network, combination of network, or variation thereof. The aforementioned communication networks and protocols are well known and need not be discussed at length here.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Indeed, the included descriptions and figures depict specific embodiments to teach those skilled in the art how to make and use the best mode. For the purpose of teaching inventive principles, some conventional aspects have been simplified or omitted. Those skilled in the art will appreciate variations from these embodiments that fall within the scope of the disclosure. Those skilled in the art will also appreciate that the features described above may be combined in various ways to form multiple embodiments. As a result, the invention is not limited to the specific embodiments described above, but only by the claims and their equivalents.

What is claimed is:

1. A system for providing high availability electrical power to a data center, the system comprising:

a geothermal extraction well comprising an output, wherein the output emits geothermal energy;

an underground hydrogen storage;

a turbine-generator system comprising a turbine and a generator, wherein:

the turbine-generator system is coupled to the output of the geothermal extraction well, the turbine converts the geothermal energy into mechanical energy, the generator converts the mechanical energy into electricity, and the electricity is served to the data center as primary power of the data center;

a fuel cell coupled to the underground hydrogen storage via a valve, wherein:

the fuel cell generates backup electricity using hydrogen from the underground hydrogen storage, and the backup electricity is served to the data center as backup power of the data center; and a control system, comprising:

a backup controller, comprising:

one or more backup processors; and one or more backup memories having stored thereon instructions that, upon execution by the one or more backup processors, cause the one or more backup processors to:

detect a disruption in the primary power of the data center, in response to detecting the disruption:

transmit a first signal to the valve, wherein the first signal opens the valve to allow flow of the hydrogen to the fuel cell; and transmit a second signal to the fuel cell, wherein the second signal initiates operation of the fuel cell.

2. The system of claim 1, wherein the underground hydrogen storage comprises an area surrounding the geothermal extraction well that was created using pipe-in-pipe drilling.

3. The system of claim 2, wherein the hydrogen is stored in gaseous form in one or more sealed containers disposed within the area.

4. The system of claim 1, further comprising:

a battery configured to generate transitional backup electricity, wherein:

the transitional backup electricity is served to the data center as transitional backup power of the data center, and the instructions on the one or more backup memories of the backup controller comprises further instructions that, upon execution by the one or more backup processors, cause the one or more backup processors to:

in response to detecting the disruption:

transmit a third signal, wherein the third signal initiates operation of the battery.

5. The system of claim 1, further comprising:

a connection to a public electrical grid;

wherein the control system comprises a distribution controller, comprising:

one or more grid connection processors; and one or more grid connection memories having stored thereon instructions that, upon execution by the one or more grid connection processors, cause the one or more grid connection processors to:

in response to detecting a load requirement of the data center is less than the primary power of the data center, transmit a third signal to allow flow of excess electricity to the public electrical grid via the connection.

6. The system of claim 1, further comprising:

an electrolyzer coupled to the underground hydrogen storage;

wherein the control system comprises a distribution controller, comprising:

one or more hydrogen processors, and one or more hydrogen memories having stored thereon instructions that, upon execution by the one or more hydrogen processors, cause the one or more hydrogen processors to:

in response to detecting a load requirement of the data center is less than the primary power of the data center:

transmit a third signal to allow flow of excess electricity to the electrolyzer to generate new hydrogen; and transmit a fourth signal to allow flow of the new hydrogen to the underground hydrogen storage.

7. The system of claim 1, further comprising:

a heat capture system configured to:

capture excess geothermal energy from the turbine-generator system; and provide the excess geothermal energy to a heat reuse application.

8. The system of claim 7, wherein the heat reuse application comprises a direct air capture system.

9. The system of claim 1, further comprising:

a heat capture system configured to:

capture thermal energy from the operation of the fuel cell, operation of the data center, or a combination thereof; and provide the captured thermal energy to a heat reuse application.

10. The system of claim 1, wherein:

the control system comprises a distribution control system configured to distribute the primary power and the backup power to one or more racks of the data center;

each of the one or more racks of the data center has a corresponding level of availability; and the distribution of the primary power and the backup power to each of the one or more racks is based at least in part on the corresponding level of availability.

11. A method for providing high availability electrical power to a data center, the method comprising:

extracting geothermal energy via a geothermal extraction well;

storing hydrogen in an underground hydrogen storage;

generating primary electricity with a turbine-generator system comprising a turbine and a generator, wherein:

the turbine converts the geothermal energy extracted via the geothermal extraction well into mechanical energy, and the generator converts the mechanical energy into the primary electricity;

serving the primary electricity to the data center as primary power of the data center; and in response to detecting a disruption in the primary power of the data center:

allowing flow of the hydrogen to a fuel cell, initiating operation of the fuel cell to generate backup electricity using the hydrogen, and serving the backup electricity to the data center as backup power of the data center.

12. The method of claim 11, wherein the underground hydrogen storage comprises an area surrounding the geothermal extraction well that was created using pipe-in-pipe drilling.

13. The method of claim 12, wherein the hydrogen is stored in gaseous form in one or more sealed containers disposed within the area.

14. The method of claim 11, further comprising:

in response to detecting the disruption in the primary power of the data center:

initiating operation of a battery that provides transitional backup power of the data center during a transitional period of the initiating operation of the fuel cell.

15. The method of claim 11, further comprising:

in response to detecting a load requirement of the data center is less than the primary power of the data center, transmit a third signal to allow flow of excess electricity to a public electrical grid via a grid connection.

16. The method of claim 11, further comprising:

in response to detecting a load requirement of the data center is less than the primary power of the data center:

allowing flow of excess electricity to an electrolyzer to generate new hydrogen; and allowing flow of the new hydrogen to the underground hydrogen storage.

17. The method of claim 11, further comprising:

capturing excess geothermal energy from the turbine-generator system; and providing the excess geothermal energy to a heat reuse application.

18. The method of claim 17, wherein the heat reuse application comprises a direct air capture system.

19. The method of claim 11, further comprising:

capturing thermal energy from the operation of the fuel cell, operation of the data center, or a combination thereof; and providing the captured thermal energy to a heat reuse application.

20. The method of claim 11, further comprising:

distributing the primary power and the backup power to one or more racks of the data center, wherein:

each of the one or more racks of the data center has a corresponding level of availability, and the distribution of the primary power and the backup power to each of the one or more racks is based at least in part on the corresponding level of availability.

* * * * *